United States Patent [19]
Tantlinger

[11] 3,722,716
[45] Mar. 27, 1973

[54] METHOD AND APPARATUS FOR LOADING AND UNLOADING AIR CARGO

[75] Inventor: Keith W. Tantlinger, Rancho Santa Fe, Calif.

[73] Assignee: Fruehauf Corporation, Detroit, Mich.

[22] Filed: June 17, 1970

[21] Appl. No.: 46,930

[52] U.S. Cl. ............... 214/38 B, 180/79.2 R, 214/85, 214/152, 214/512
[51] Int. Cl. .............................................. B65g 67/02
[58] Field of Search...214/38 B, 38 BA, 38 BB, 38 C, 214/38 CC, 85, 512, 515, 152

[56] References Cited

UNITED STATES PATENTS

| | | | |
|---|---|---|---|
| 1,835,133 | 12/1931 | Bergen | 214/38 B X |
| 3,119,506 | 1/1964 | Bridge et al. | 214/38 CC X |
| 3,595,408 | 7/1971 | Eddy et al. | 214/515 X |
| 3,421,646 | 1/1969 | Rouse et al. | 214/38 CC X |
| 3,474,925 | 10/1969 | McCartney et al. | 214/512 |
| 3,233,767 | 2/1966 | Goodacre | 214/512 |
| 3,039,581 | 6/1962 | Buisson | 193/38 |
| 2,127,613 | 8/1938 | Nampa | 105/368 R |
| 3,153,544 | 10/1964 | Jung et al. | 214/512 X |

*Primary Examiner*—Robert G. Sheridan
*Attorney*—Imirie, Smiley, Snyder & Butrum

[57] ABSTRACT

In a first form of the invention, a mobile unit includes means for accurately locating a road-worthy chassis thereon. Lifting and lowering means is carried by the mobile unit for lifting and lowering a moveable platform mounted on said chassis. A chassis is moved onto the mobile unit, the platform is raised so that the upper surface is substantially flush with the upper surface of a cargo deck in the aircraft, cargo is transferred between the upper surfaces, the platform is then lowered onto the chassis, and the chassis is moved off the mobile unit. In another form of the invention, a mobile dock includes a load carrying portion supported by a plurality of wheel assemblies. Means is provided for raising and lowering the load carrying portion with respect to the wheel assemblies and comprises struts including cam operated steering means whereby the wheels are steered upon relative vertical movement of the load carrying portion with respect to the wheels. In this latter form of the invention, a road-worthy chassis is moved onto the load carrying portion of the mobile dock and the dock is moved into operative position. The load carrying portion of the dock is raised until the upper load carrying surface of the road-worthy chassis thereon is substantially flush with the upper surface of the cargo deck, whereupon cargo is transferred between said upper surfaces. The dock is then moved away from the aircraft and the load carrying portion is lowered whereupon the road-worthy chassis is moved off of the mobile dock. Two forms of the invention may also be used in combination with one another wherein the upper surface of the platform supported above a chassis on the mobile unit may serve as a bridge for cargo passing thereover onto the upper load carrying surface of a chassis carried by a dock disposed adjacent the mobile unit.

8 Claims, 22 Drawing Figures

INVENTOR
KEITH W. TANTLINGER

BY Snyder and Butram

ATTORNEY

INVENTOR
KEITH W. TANTLINGER

BY *Snyder and Butrum*

ATTORNEY

INVENTOR
KEITH W. TANTLINGER

BY
ATTORNEY

INVENTOR
KEITH W. TANTLINGER

BY Snyder and Butram

ATTORNEY

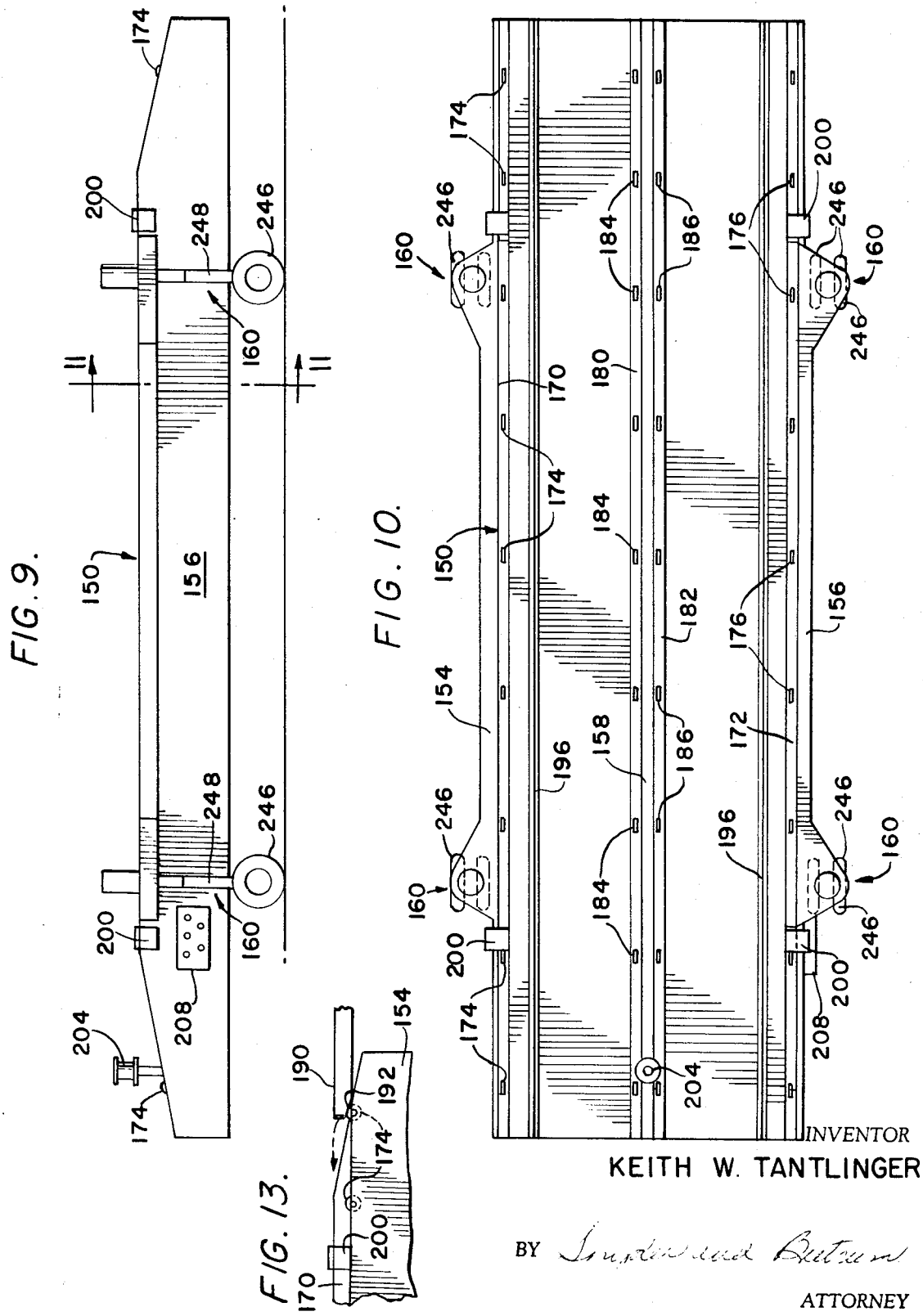

INVENTOR
KEITH W. TANTLINGER

INVENTOR
KEITH W. TANTLINGER

BY *Snyder and Butrum*

ATTORNEY

INVENTOR
KEITH W. TANTLINGER

ATTORNEY

INVENTOR
KEITH W. TANTLINGER

BY Snyder and Butram
ATTORNEY

INVENTOR
KEITH W. TANTLINGER

BY *Snyder and Butrum*
ATTORNEY

METHOD AND APPARATUS FOR LOADING AND UNLOADING AIR CARGO

BACKGROUND OF THE INVENTION

The present invention relates to a method and apparatus for handling air cargo, and particularly to the problem of transferring air cargo between aircraft and land vehicles. The development of giant cargo aircraft such as the jumbo jets now being used has caused existing air cargo handling systems to become obsolete. The shortest possible turn around time is of prime importance as well as the elimination of unnecessary transfer operations. The amount of air cargo carried by such aircraft is of an order of magnitude such that it requires brand new methods and apparatus for handling such cargo.

In the past, it has been a common practice to transfer air cargo from aircraft onto mobile docks having cargo decks, whereupon the mobile docks are moved to a position adjacent to a fixed terminal installation and the cargo is in turn transferred onto such fixed terminal facility. The cargo is then subsequently transferred onto a road-worthy chassis for delivery to its ultimate destination.

An alternative procedure is to tow the aircraft to a fixed terminal and then properly aligning the aircraft with the cargo floor of the terminal, which is a very difficult task in many instances. The cargo is then transferred directly from the aircraft to the terminal.

SUMMARY OF THE INVENTION

The present invention provides a method and apparatus for handling air cargo which takes maximum advantage of the trend toward unitization and containerization of air freight, and which at the same time is compatible with traditional systems for dissecting an aircraft load of freight at the airport for forwarding to its eventual destination.

The present invention transfers the air cargo directly between an aircraft and a road-worthy chassis. A portion of the road-worthy chassis is elevated to from an extension of the aircraft cargo floor so that the air cargo can be transferred directly between the aircraft and the portion of the road-worthy chassis to eliminate intermediate transfer operations.

During unloading operations, the air cargo can be transferred to road equipment at the threshold of the aircraft, rendering the freight completely and immediately mobile for a trip to any desired location. Containerized or palletized freight can arrive at the airport on its road-worthy and road-legal chassis, bypass the terminal, and be loaded directly onto the aircraft utilizing the apparatus and method of loading of the present invention.

The present invention may be employed either with a "bare base" or a sophisticated and highly developed cargo terminal on or off the airfield. A system is provided which is designed to accomodate 20-foot and 40-foot air containers of the future, but is also adapted to serve the immediate need for safely and rapidly handling pallet loads. The present invention is also adapted to readily handle mixtures of air containers and pallet loads if so desired.

By placing a container on a road-worthy chassis as soon as it emerges from the aircraft, the expensive intermediate storage facilities and transfer operation equipment and time is completely eliminated.

The present invention does not require any special fixed airport facilities and can be built for less expenditure of funds or time than a fixed installation. The apparatus of the present invention is fully mobile on the ground and in the air in the sense that it can be transported by air to a "bare base" environment and then utilized thereafter to service aircraft. The apparatus can then be subsequently removed and relocated if desired. The present invention provides a means for handling virtually any combination of palletized, containerized on roll-on roll-off cargo. Additionally, the apparatus of the present invention is suitable for serving both the forward and the aft access doors of modern jumbo aircraft.

In a first form of the invention, a mobile unit is adapted to receive a road-worthy chassis thereon, and lifting and lowering means is provided on the mobile unit for lifting and lowering a moveable platform relative to the chassis disposed thereon. When utilizing this form of the invention, a road-worthy chassis is moved onto the mobile unit and the platform of the chassis is then raised so that the upper surface of the platform is substantially flush with the upper surface of the cargo deck of the aircraft. The cargo is then transferred between said upper surfaces, whereupon the platform is lowered back onto the chassis and the chassis is moved off of the mobile unit.

In a second form of the invention, a mobile dock includes a load carrying portion supported by wheel assemblies and means is provided for raising and lowering the load carrying portion with respect to the wheels thereof. The load carrying portion is adapted to receive a conventional road-worthy chassis having an upper load carrying surface thereon.

When utilizing this second form of the invention, the load carrying portion is raised to a position such that the upper load carrying surface of the road-worthy chassis thereon is substantially flush with the upper surface of the cargo deck of the aircraft, whereupon the cargo is transferred between such upper surfaces.

The dock is then moved away from the aircraft and lowered relative to the associated wheels, whereupon the road-worthy chassis is connected with a tractor and moved off on the mobile dock and thence to its ultimate destination.

The first two forms of the invention can also be utilized in combination with one another whereby a road-worthy chassis is moved onto a mobile unit and the moveable platform thereof is elevated into position, whereupon a mobile dock having a road-worthy chassis on the load carrying portion thereof is positioned adjacent the mobile unit and the load carrying portion raised so that the upper load carrying surface of the road-worthy chassis thereon is in position. The cargo can then be transferred from the aircraft either onto the moveable platform, or alternatively, across the mobile platform onto the upper load carrying surface of the road-worthy chassis carried by the adjacent mobile dock. In this manner, various forms of cargo can be selectively transferred onto either of the load receiving surfaces positioned adjacent the access opening of the aircraft.

The present invention also provides a novel means for steering a vehicle, this novel steering means being particularly adapted for utilization with the second form of the invention described hereinabove. The wheel assemblies supporting the vehicle are provided with lifting and lowering and steering strut means which is hydraulically operated and includes cam operated steering means such that the wheels are steered in the desired direction by relative vertical movement of the load carrying portion of the vehicle with respect to the wheels thereof.

This type of steering mechanism is of particular utility when utilized with a vehicle such as a mobile dock wherein it is necessary to raise and lower the dock at different times during the use thereof.

BRIEF DESCRIPTION OF THE DRAWINGS

FIG. 9 is a side view of a mobile dock according to a second form of the invention;

FIG. 10 is a top view of the mobile dock shown in FIG. 9;

FIG. 13 is an enlarged view of one end portion of the mobile dock shown in FIG. 9.

DESCRIPTION OF THE PREFERRED EMBODIMENTS

Figure 1:
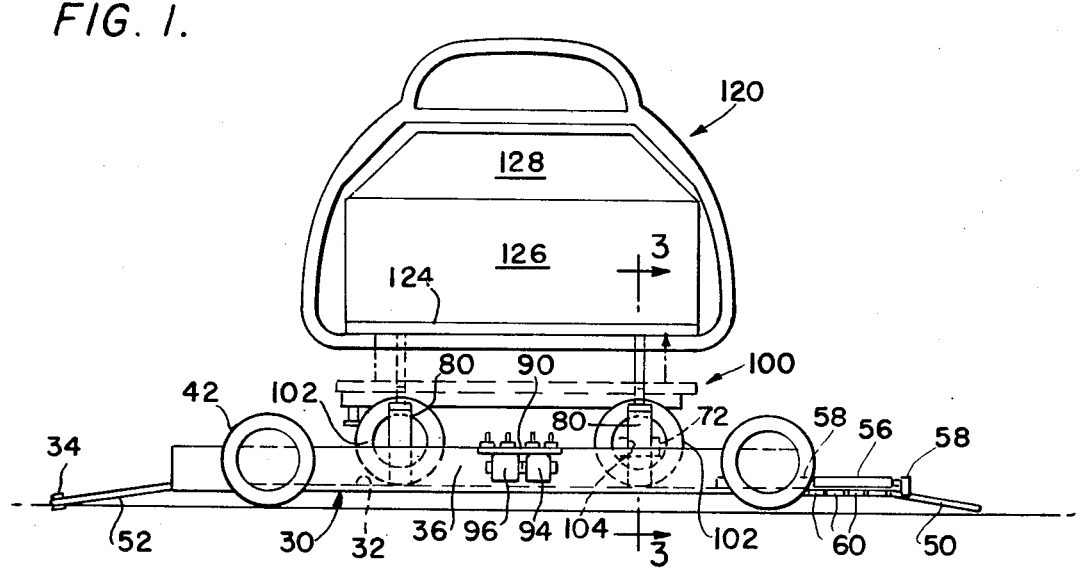
FIG. 1 is a side view illustrating a mobile unit having a road-worthy chassis supported thereon according to a first form of the invention.

Referring now to the drawings wherein like reference characters designate corresponding parts throughout the several views, apparatus according to the first form of the invention is shown in FIGS. 1–4 inclusive. A mobile unit is indicated generally by reference number 30 and includes a chassis supporting floor 32 joined with vertically extending side walls 34 and 36 which in turn join with inwardly extending flanges 38 and 40 disposed substantially parallel with floor 32. The mobile unit includes a plurality of wheels 42 whereby the unit may be readily moved from one place to another. A ramp 50 is provided at one end of the mobile unit and a ramp 52 is provided at the opposite end thereof, these ramps facilitating movement of a tractor and an associated road-worthy chassis onto and off of the mobile unit.

Figure 2:
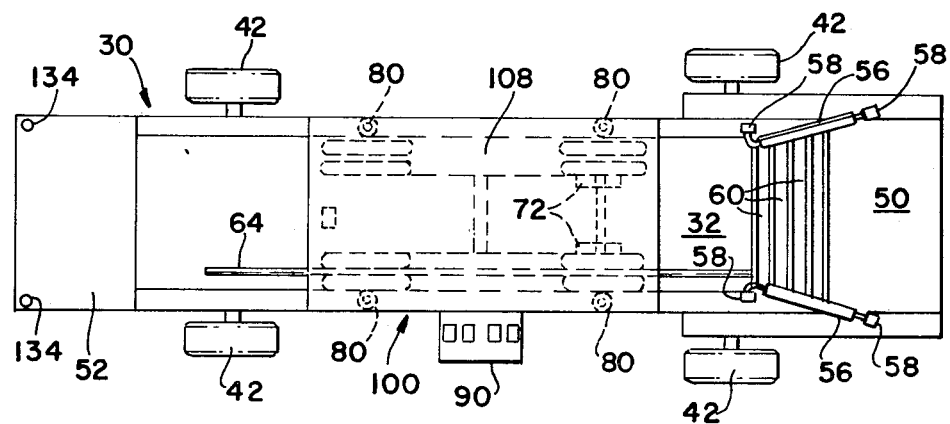
FIG. 2 is a top view of the structure shown in FIG. 1.
Figure 3:
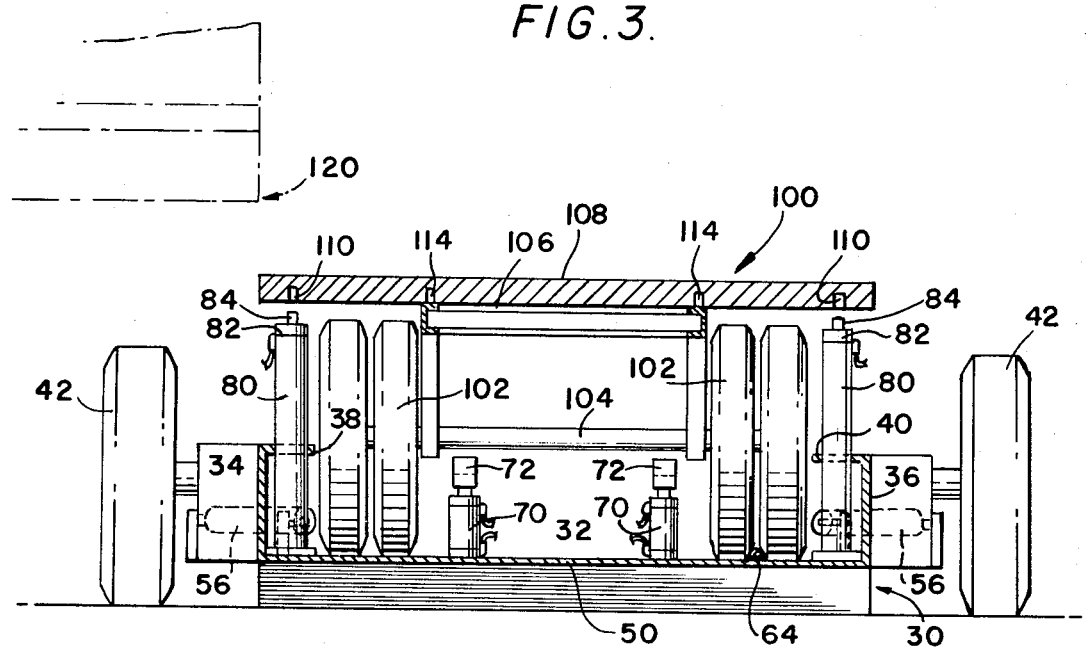
FIG. 3 is a sectional view on an enlarged scale taken substantially along line 3—3 of FIG. 1 looking in the direction of the arrows and illustrating the components in a first operative position.
Figure 4:
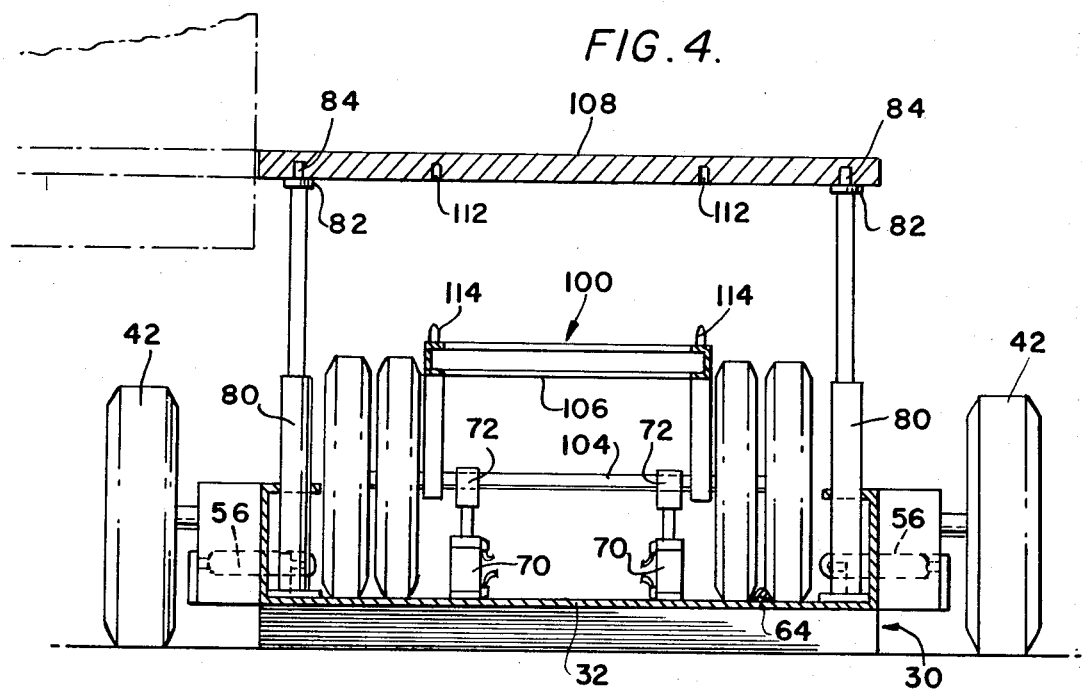
FIG. 4 is a view similar to FIG. 3 illustrating the components in a second operative position.

Locating means is provided on the mobile unit for accurately positioning a chassis thereon. This locating means includes a guide means in the form of a pair of guide members 56 of similar construction, these guide members comprising metallic idler rollers rotatably supported by structural supports 58 at opposite ends thereof. These idler members are adapted to engage the lower side wall of the tires of a tractor or chassis moving onto the mobile unit, it being noted particularly as seen in FIG. 2 that the guide members are disposed at an angle so as to define an opening therebetween which tapers toward the center of the mobile unit. Accordingly, as a tractor is driven onto the mobile unit, the guide members serve to accurately position the tractor laterally of the unit.

A plurality of separate segments 60 are supported by the mobile unit, these segments being suspended from the mobile unit so that they are adapted to move in a lateral direction with respect thereto. Accordingly, when the guide members force a tractor and chassis wheels laterally, the wheels are adapted to move along with the supporting segments in a lateral direction.

A wheel guide 64 is supported on floor 32 and extends longitudinally of the unit, this wheel guide being of generally inverted V-shaped cross-sectional configuration and adapted to fit between the dual wheels provided on an associated road-worthy chassis so as to accurately guide such road-worthy chassis as it moves longitudinally of the mobile unit.

The locating means also includes means for accurately positioning a road-worthy chassis longitudinally of the mobile unit. This means includes a pair of hydraulic jacks 70 supported by floor 32 and having generally V-shaped chocks 72 connected to the piston rods thereof. These hydraulic jacks are adapted to be operated for moving the V-shaped chocks into engagement with the last axle of the chassis supported on the mobile unit. These chocks physically establish the vehicle position in an automatic manner and correct for insufficient travel or overrun. The driver of the tractor connected to the chassis need only release his brakes.

LIfting and lowering means is supported on the mobile unit and includes four spaced hydraulic jacks 80, the piston rods of said jacks having collars 82 disposed at the upper ends thereof, and pins 84 of reduced dimension extend upwardly from such collars. A control panel 90 is supported at one side of the mobile unit in such a position that an operator can stand beside the unit and control the operation thereof. This control unit provides manual controls for operating each of the jacks 80 as well as the jacks 70 and the brakes for the wheels 42. An engine 94 is mounted beneath the control panel and drives a hydraulic pump 96 which provides hydraulic power for the various hydraulically operated components of the mobile unit.

The road-worthy chassis indicated generally by reference character 100 includes a plurality of wheels 102 and a rear axle 104 adapted to be engaged by the aforementioned chocks. The chassis includes a framework 106 which supports a moveable platform 108. The platform includes a first plurality of holes 110 in the undersurface thereof adapted to receive the aforementioned pins 84, and a second plurality of holes 112 formed in the undersurface of the platform receive pins 114 provided at spaced points on the framework. Pins 114 retain the platform in position on the framework when in transit, and pins 84 hold the platform in position on the hydraulic jacks when lifting and lowering the platform.

Figure 5:
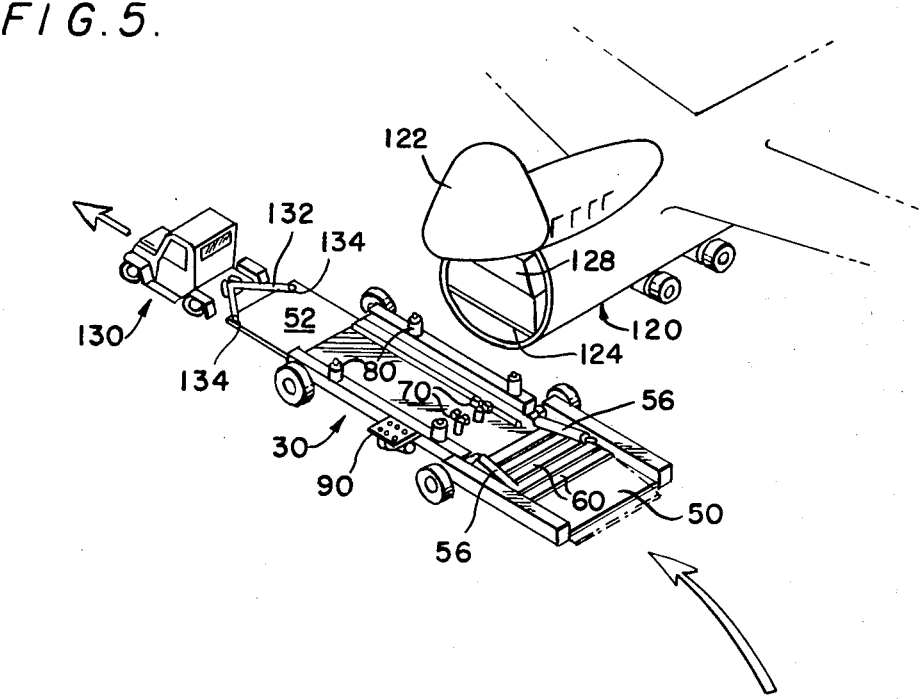
FIG. 5 is a top perspective view illustrating a first step in carrying out the method according to the first form of the invention.
Figure 6:
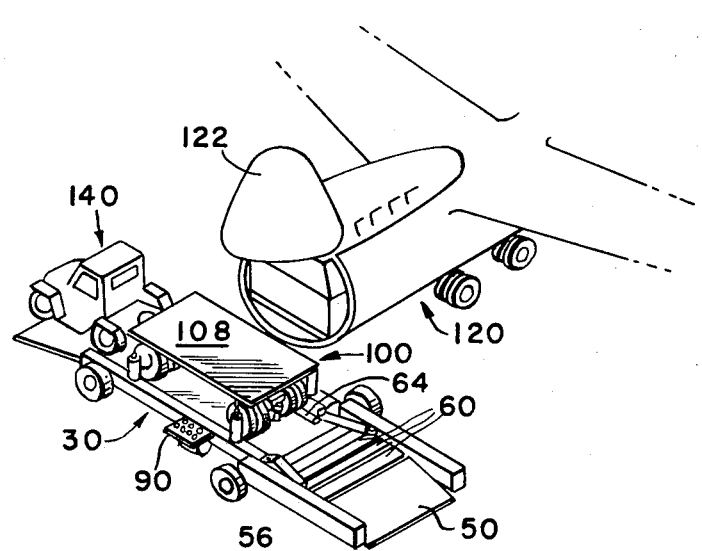
FIG. 6 is a view similar to FIG. 5 illustrating a step of the method subsequent to that shown in FIG. 5.
Figure 7:
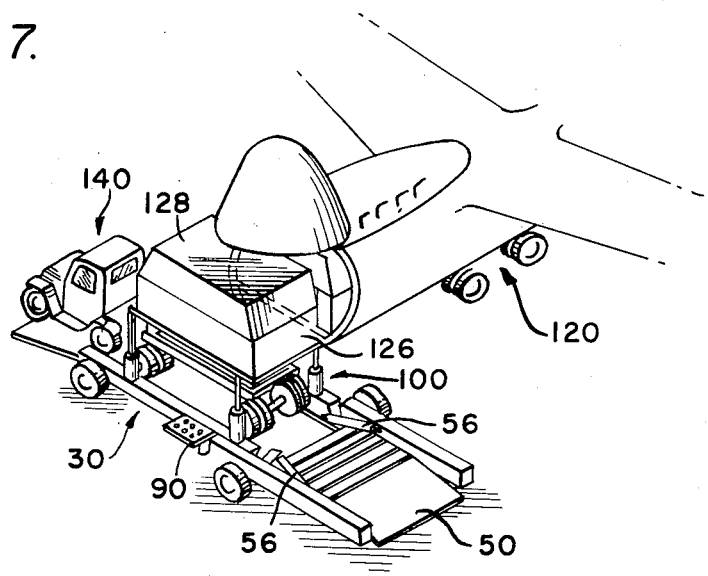
FIG. 7 is a view similar to FIG. 6 showing still a further step in carrying out the method of this form of the invention.

Referring now to FIGS. 5–7 inclusive, a large modern cargo aircraft is indicated generally by reference numeral 120 and includes a nose section 122 which pivots upwardly to provide an access opening to the cargo space of the aircraft. A cargo deck 124 is provided within the aircraft and supports a plurality of cargo containers therewithin. A first container 126 may comprise a standard shipping container such as is normally mounted on road-worthy chassis for transport overland. A second special trapezoidal shaped container 128 is supported on the first mentioned container 126. Container 128 is of the configuration shown so as to utilize the maximum amount of cargo space within the aircraft.

As seen in FIG. 5, a tractor or other prime mover 130 is connected by a suitable towing hitch 132 with towing fittings 134 provided at one end of the mobile unit. The mobile unit has been moved into operative position relative to the aircraft such that the longitudinal axis of the mobile unit extends substantially perpendicular to the longitudinal axis of the aircraft. After the mobile unit has been positioned as shown in FIG. 5, the brakes are set and tractor 130 is disconnected from the mobile unit, whereupon the mobile unit is in condition for receiving a road-worthy chassis thereon.

As seen in FIG. 6, a road-worthy chassis 100 as described previously is operatively connected by the usual fifth wheel connection with a tractor 140. Assuming that it is desired to unload the aircraft, the tractor tows the empty chassis firstly into the near end of the mobile unit and through the alignment chute defined by guide members 56. This eliminates driver's skill as a factor in establishing proper alignment of the vehicle and prevents the danger of damage to the aircraft due to drive error. The hydraulic jacks 70 are then actuated so as to properly position the chassis longitudinally with respect to the mobile unit.

Hydraulic jacks 80 are then actuated to raise the platform 108 off of the framework of the chassis and up to a level where the upper surface of the platform is substantially flush with the upper surface of the cargo deck within the aircraft as seen in FIG. 7. Suitable photoelectric optical equipment is provided for properly orienting the upper surface of the platform with the upper surface of the cargo deck in the aircraft, and this equipment is connected so as to insure that the platform remains aligned with the cargo deck during the transfer of cargo therebetween.

The cargo is transferred from the aircraft onto the platform and the platform is then lowered by hydraulic jacks 80 back onto the framework of the road-worthy chassis. Jacks 70 are then operated so as to release chocks 72 from axle 104 of the chassis, whereupon tractor 140 is adapted to move the chassis off the mobile unit, and the tractor along with the chassis and the load thereon can be driven directly to the desired destination.

Figure 8:
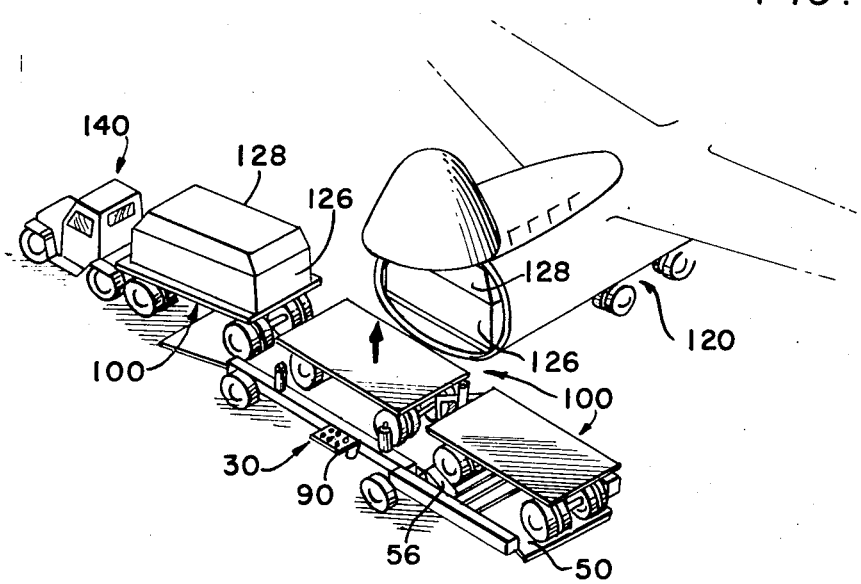
FIG. 8 is a view similar to FIG. 6 illustrating a modified manner of carrying out the method according to the first form of the invention.

Referring now to FIG. 8, a modified manner of carrying out the method of the first form of the invention is illustrated wherein a single tractor 140 is interconnected with a plurality of road-worthy chassis 100 connected in series with one another by suitable coupling means. It is apparent that the various road-worthy chassis can be sequentially moved into operative relationship on a mobile unit and the platform of the individual chassis separately raised and lowered so as to transfer cargo between the aircraft and the chassis.

Referring now to FIGS. 9–12 inclusive, a second form of the invention is illustrated. A mobile dock indicated generally by reference character 150 includes a load carrying portion for receiving road-worthy chassis and including a floor 152 joining with opposite vertically extending side walls 154 and 156, a central dividing wall 158 extending longitudinally of the dock. The dock includes four spaced wheel assemblies 160, each of these wheel assemblies including means for raising and lowering the load carrying portion with respect to the wheels thereof. The wheel assemblies are also provided with means for steering the wheels thereof, and the details of construction of these wheel assemblies is more fully set forth hereinafter.

Recessed channels 170 and 172 are provided in the upper inner portions of each of side walls 154 and 156 respectively and extend longitudinally of the dock. Spaced anti-fraction means in the forms of rollers 174 and 176 are provided in channels 170 and 172 respectively for a purpose hereinafter described.

The opposite upper edges of dividing wall 158 are provided with channels 180 and 182 having spaced rollers 184 and 186 formed therein respectively, these rollers cooperating with the aforementioned rollers as hereinafter explained.

Figure 11:
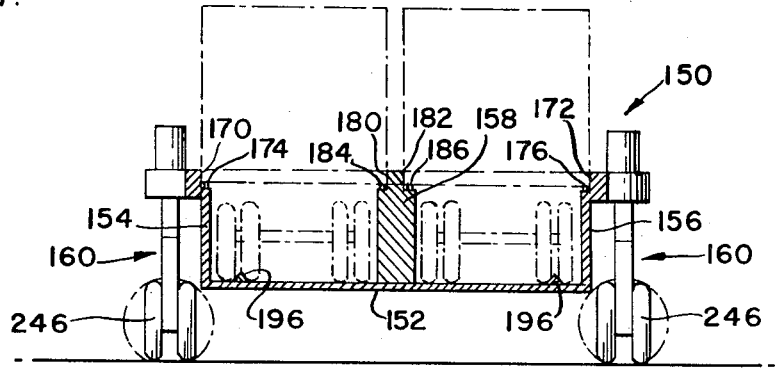
FIG. 11 is a sectional view taken substantially along line 11—11 of FIG. 9 looking in the direction of the arrows.
Figure 12:
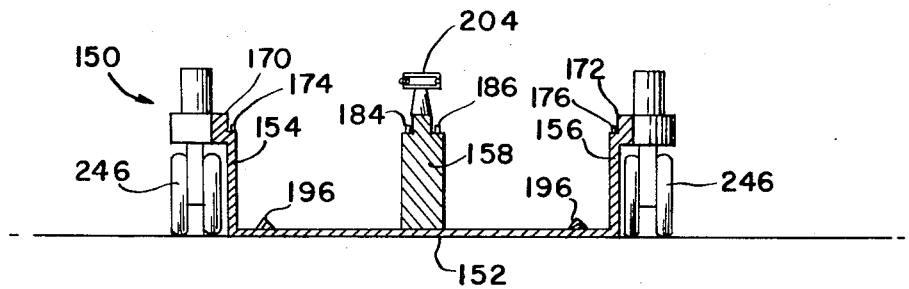
FIG. 12 is a view similar to FIG. 11 illustrating the components in a different operative position.

Referring now to FIG. 13, the framework 190 of a road-worthy chassis is illustrated, this framework having a tapered undersurface 192 at the forward end thereof which is adapted to cooperate with the rollers supported within the dock. As the chassis is towed into the mobile dock, the rollers on the dock engage surface 192 and then the undersurface of the framework of the chassis. The tractive force of the tractor enables the chassis to ride up onto the rollers so as to raise the chassis tires off the floor of the dock. The rollers thereby automatically cancel out all variables caused by load variations, spring deflection, tire pressure or wear, commercial trailer manufacturing tolerances, and driver skill. As seen in FIG. 11, guide means 196 in the form of elongated generally inverted V-shaped guides are provided on floor 152 of the dock and are adapted to cooperate with the wheels so as to properly align the chassis as it moves longitudinally within the dock.

Suitable hydraulically operated stop means 200 are provided at opposite ends of the dock for limiting longitudinal movement of chassis therewithin. A hydraulically operated winch 204 having a conventional flexible steel wire rope reeved thereon is provided for moving cargo onto the upper load carrying surface of chassis supported by the dock.

A control panel 208 is supported at the side of the dock for selectively operating the various hydraulically operated components of the dock. A conventional engine and hydraulic pump are provided on the dock so as to provide a self contained unit. The hydraulic jacks included in each of the wheel assemblies as hereinafter described are individually operated so as to control steering of the dock.

Figure 14:
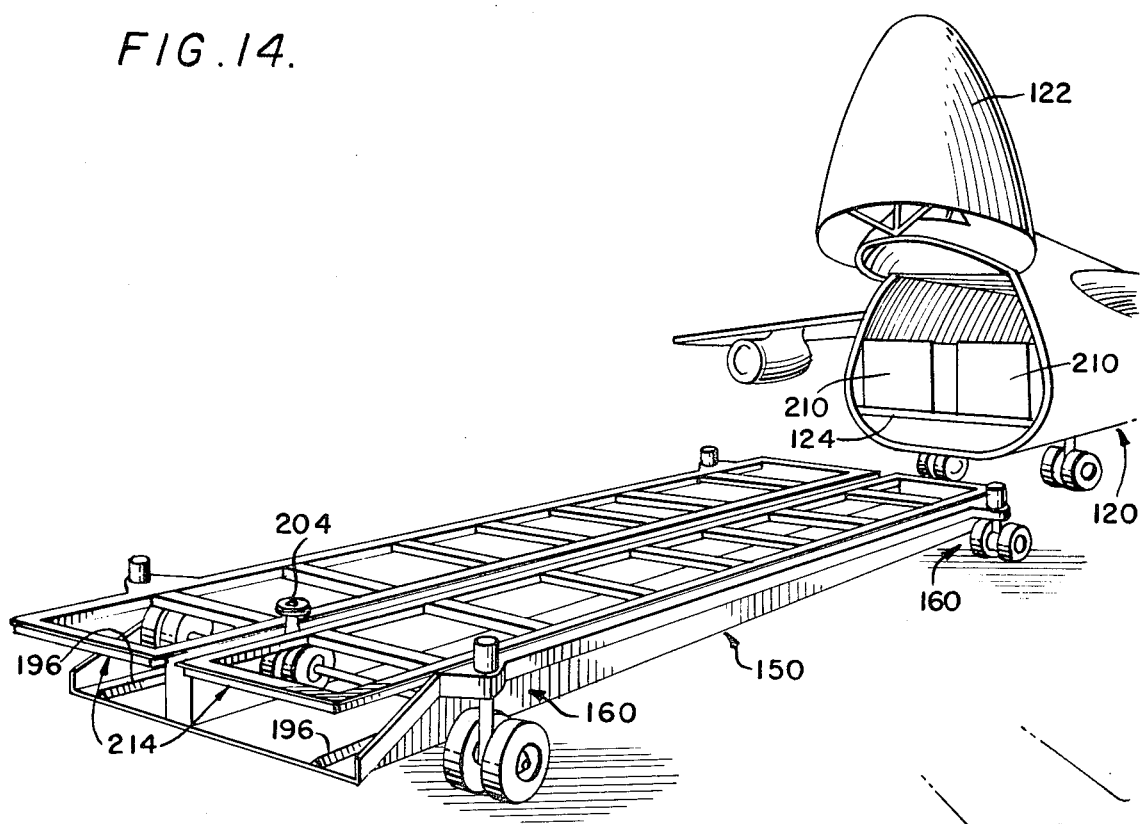
FIG. 14 is a top perspective view illustrating the movile dock of the second form of the invention with a pair of road-worthy chassis supported therein adjacent an aircraft.

Referring now to FIG. 14, this form of the invention is adapted to be employed with the same type of aircraft previously described, and this aircraft and the components thereof have been given the same reference numbers. The cargo includes elongated containers 210, these containers being adapted to be received on the upper load carrying surfaces of a pair of conventional road-worthy chassis 214 illustrated as disposed in operative position within the dock. The dock is illustrated in the position wherein the load carrying portion thereof is lowered with respect to the wheel assemblies thereof. The load carrying portion is adapted to be raised so that the upper load carrying surface of each of the chassis supported thereby becomes an extension of the cargo floor of the aircraft and substantially flush therewith.

In carrying out the method with this form of the invention, a road-worthy chassis is moved onto the load carrying portion of the mobile dock, by driving a tractor connected to such chassis through the dock and disconnecting the tractor from the chassis. The dock is then moved into position relative to the aircraft and the load carrying portion is raised to a point where the upper surface of the load carrying portion of the chassis is substantially flush with the upper surface of the cargo deck in the aircraft, whereupon the cargo is transferred between such surfaces.

The dock is then moved away from the aircraft and the load carrying portion is lowered into its lowermost position. A tractor is then attached to the chassis, and the chassis is pulled away from the mobile dock by the tractor and to its ultimate destination.

Figure 15:
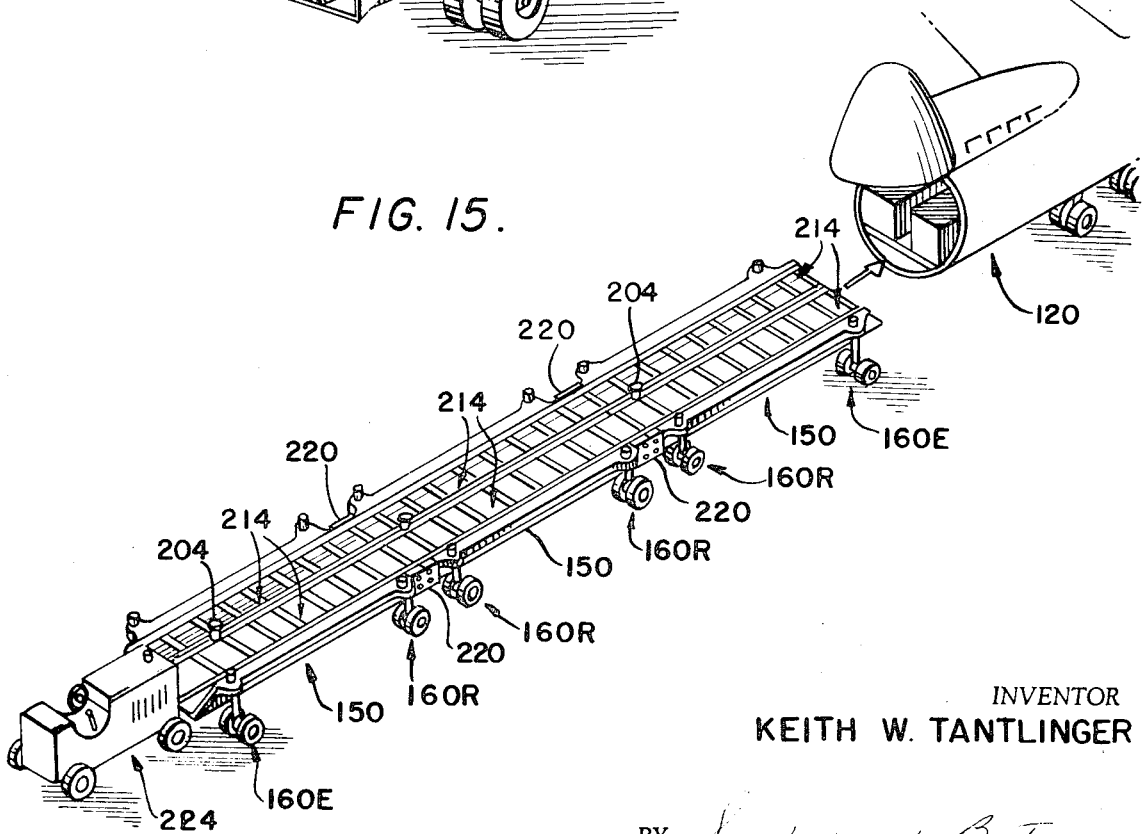
FIG. 15 is a top perspective view illustrating a first step in the method according to the second form of the invention.

Referring now to FIGS. 15-18 inclusive, a modified manner of carrying out the invention according to the second form of the invention is illustrated. As seen in FIG. 15, a plurality of docks 150 are interconnected with one another by suitable coupling means 220. The overall interconnected structure is being pushed into operative position relative to an aircraft by means of a suitable prime mover 224. All of the intermediate wheel assemblies 160R are retracted, while only the four corner wheel assemblies 160E are in their extended positions. Accordingly, all the wheel assemblies 160R are off of the ground to facilitate maneuverability and ease of steering as the overall structure is being pushed into operative position relative to an aircraft.

Figure 16:
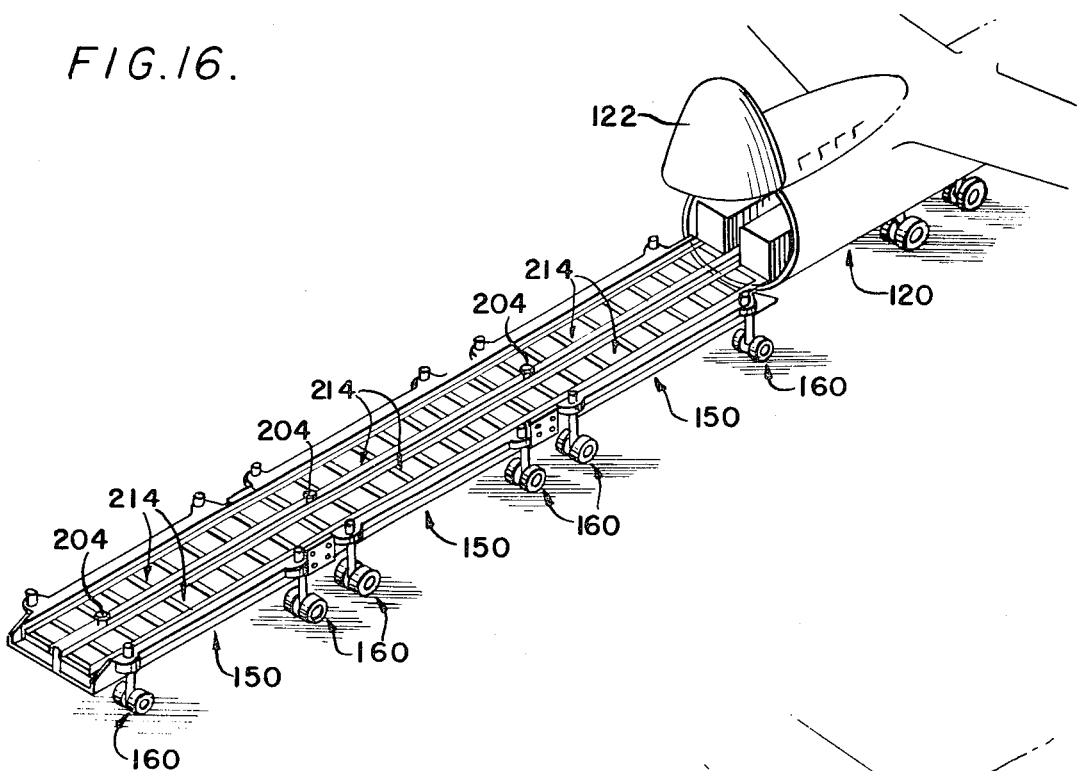
FIG. 16 is a view similar to FIG. 15 illustrating a subsequent step of the method of this form of the invention.

Referring now to FIG. 16, the overall dock structure has been moved to a point adjacent the aircraft. Once this structure is aligned with the aircraft center line, the intermediate wheel assemblies are extended so that all of the wheel assemblies are on the ground and the structure is in condition to receive the cargo from the aircraft. The wheel assemblies are extended as necessary to bring the upper load carrying surface of the chassis 214 supported thereon into position substantially flush with the upper surface of the cargo deck within the aircraft so that these load carrying surfaces form an extension of the cargo deck in the aircraft. This extended position of the wheel assemblies is statically established and dynamically maintained throughout the subsequent unloading and reloading steps by suitable equipment such as the photoelectric equipment previously described.

Figure 17:
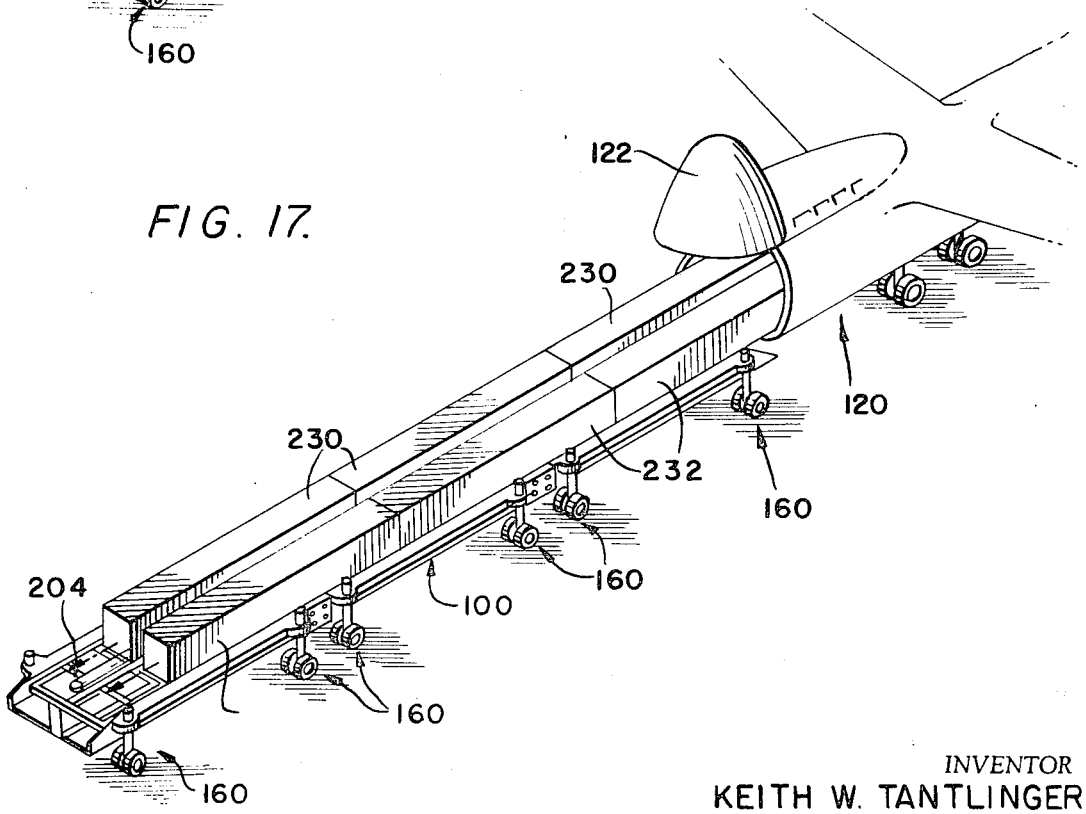
FIG. 17 is a view similar to FIG. 16 illustrating still a further step in this method.

Referring now to FIG. 17, unloading of the aircraft is illustrated wherein a first stick includes a plurality of containers 230 and a second stick includes a further plurality of containers 232. These sticks are being withdrawn by the winch 204, and both sticks are illustrated as being withdrawn simultaneously, although either stick or even partial sticks consisting of containers or pallets can be withdrawn as desired.

Figure 18:
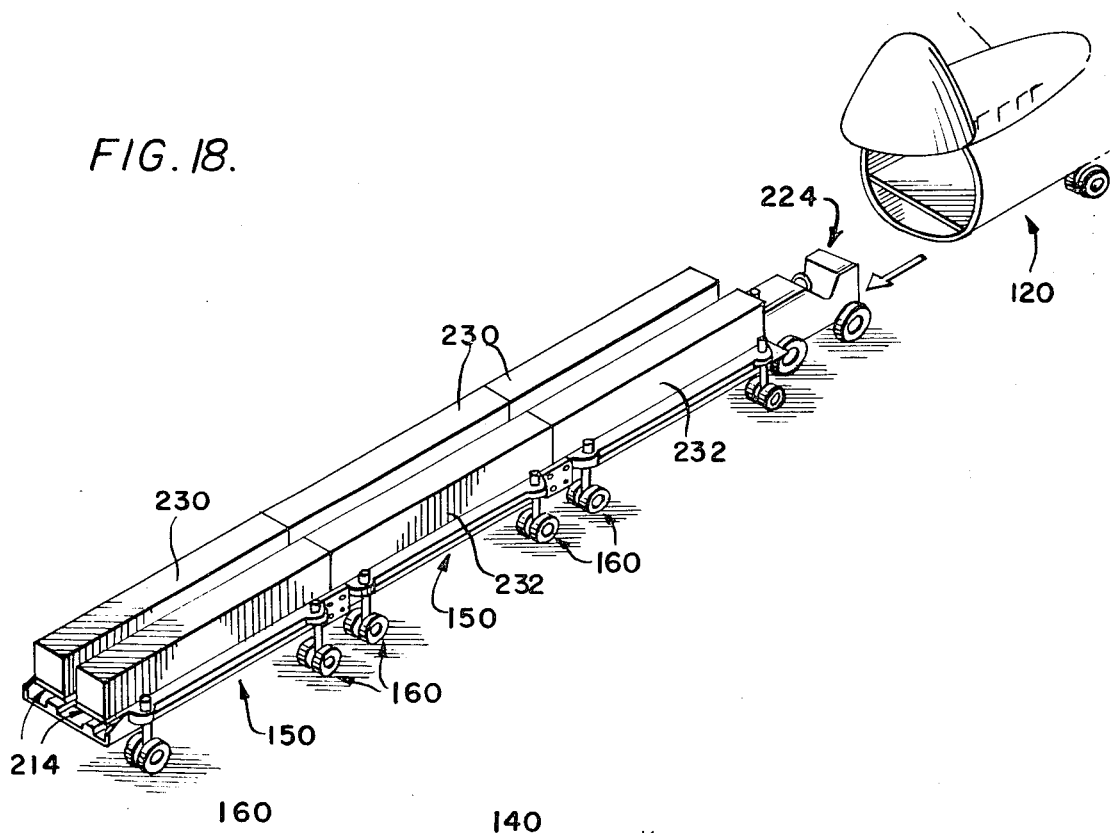
FIG. 18 is a view illustrating a subsequent step in the method according to the second form of the invention.

Referring now to FIG. 18, a prime mover 224 is illustrated as moving the loaded dock structure away from the aircraft to a suitable position where the individual docks can be unloaded. When an unloading point is reached, the load carrying portions of the docks are lowered with respect to the wheel assemblies thereof and the road-worthy chassis are attached to suitable tractors which are adapted to move the chassis off of the docks and to any suitable destination.

Figure 19:
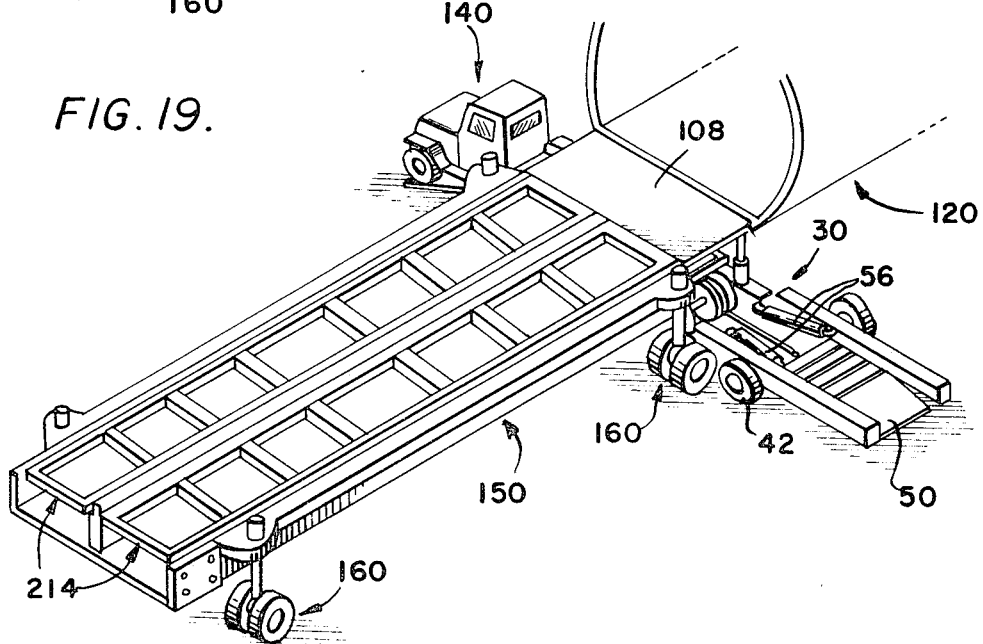
FIG. 19 is a top perspective view illustrating the manner in which both forms of the invention can be employed in combination with one another.

Referring now to FIG. 19 of the drawings, the manner in which the two forms of the invention may be utilized in combination with one another is illustrated. The first form of the invention including the mobile unit 30 is first moved into operative position as aforedescribed, and a platform 108 of a road-worthy chassis supported on the mobile unit is elevated into operative position.

a mobile dock 150 having a road-worthy chassis 214 supported therein is then moved into position and the load carrying portion of the dock raised so that the upper load carrying surface of the chassis 214 is substantially flush with the upper surface of platform 108.

When the structures are in the operative position illustrated, the cargo within the aircraft can be transferred either onto platform 108 or across platform 108 utilizing this platform as a bridge and onto the upper load carrying surfaces of chassis 214 within the mobile dock.

When platform 108 is loaded, it can be lowered onto its associated chassis and removed from the mobile unit, and another road-worthy chassis can be moved onto the mobile unit. If the chassis supported with the dock are loaded, the dock can be moved away from the mobile unit and the chassis supported thereby moved off of the dock as aforedescribed. Another dock can then be moved into position relative to the mobile unit and an elevated platform associated with a road-worthy chassis supported on the mobile unit.

Figure 20:
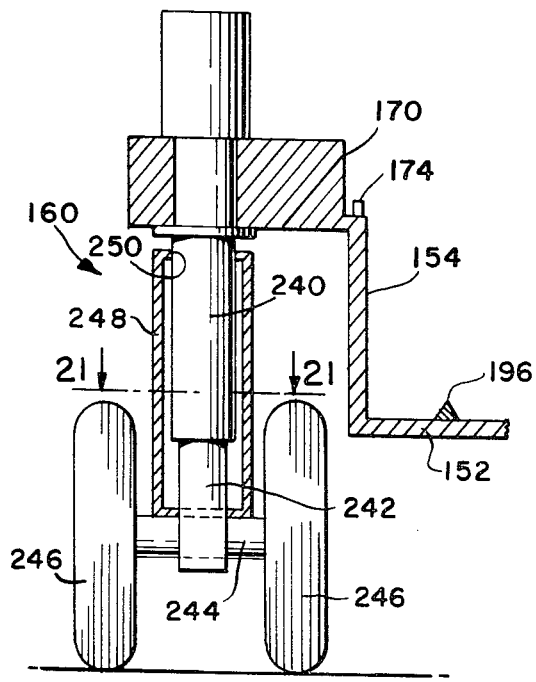
FIG. 20 is a vertical section through one of the wheel assemblies of the dock according to the second form of the invention.
Figure 22:
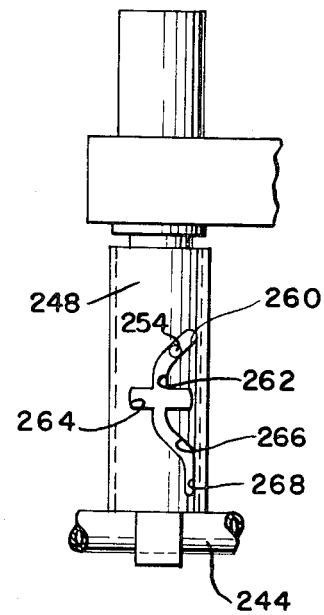
Figure 21:
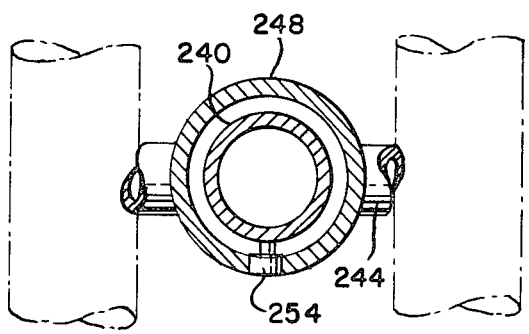
FIG. 21 is a sectional view taken substantially along line 21—21 of FIG. 20 looking in the direction of the arrows; and, FIG. 22 is an elevation illustrating the cooperative elements of the cam steering arrangement.

Referring now to FIGS. 20–22 inclusive, the details of construction of a typical wheel assembly associated with the mobile dock of the second form of the invention as aforedescribed.

Each wheel assembly includes a hydraulic jack including a cylinder 240 fixedly secured to the load carrying portion of the dock and a piston rod 242 extending from the cylinder and being secured to an axle 244 having spaced wheels 246 supported at opposite ends thereof. A barrel cam 248 is fixed to the piston rod 242 and the axle 244 and is disposed in spaced surrounding relationship to cylinder 240. The barrel cam has a central hole 250 at the upper end thereof which slidably receives cylinder 240.

The cam operated steering means includes a cam follower in the form of a roller 254 connected to cylinder 240 and which is moveable within a cam slot defined in the barrel cam.

The cam slot formed in the barrel cam includes an upper sloping portion 260, and in the operative position of the roller as illustrated, the dock is in position to move straight ahead. Upon operation of the hydraulic jacks so as to raise or lower the load carrying portion of the dock with respect to the wheel assembly, roller 254 will move upwardly or downwardly within sloping portion 260 of the slot whereby the wheels will be turned either right or left depending upon the direction of relative movement.

The cam slot also includes a vertically extending portion 262 which enables the load carrying portion of the dock to be raised and lowered without causing turning of the wheels and further, which is adapted to lock the wheels against turning movement.

The cam slot also includes a horizontally extending portion 264 which permits the wheel to freely pivot when the cam follower roller is disposed at this level while the dock is being maneuvered into position by the prime mover.

The cam slot also includes a downwardly sloping portion 266 joining with a vertical bottom portion 268 which enables the wheel to be rotated upon lowering of the dock so as to turn the associated wheel and to lock the wheel in position.

It is apparent that each wheel assembly includes a lifting and lowering and steering strut which is adapted to control steering of the wheels of the wheel assembly upon relative vertical movement of the load carrying portion of the dock with respect to the wheels thereof. This arrangement can be employed for steering various vehicles and is of particular utility in conjunction with the mobile dock of the present invention which must be raised and lowered from time to time during use thereof.

As this invention may be embodied in several forms without departing from the spirit or essential characteristics thereof, the present embodiment is therefore illustrative and not restrictive.

What is claimed is:

1. The method of loading or unloading air cargo comprising, positioning a cargo aircraft in position and providing an access opening to the cargo space thereof, positioning a mobile unit including lifting and lowering means adjacent the access opening in said aircraft, moving a road-worthy chassis including a moveable platform onto said mobile unit, lifting the platform with said lifting and lowering means off the chassis while the chassis remains in position to a level such that the upper surface of said platform is substantially flush with the upper surface of the cargo deck in the aircraft, transferring cargo from one of said surfaces to the other of said surfaces, lowering said platform back onto said chassis, and moving said chassis off of said mobile unit.

2. The method as defined in claim 1, including the subsequent step of moving said mobile unit away from said aircraft.

3. The method as defined in claim 1, wherein the step of moving a road-worthy chassis onto said unit includes the step of guiding said road-worthy chassis into proper lateral position on said mobile unit.

4. The method as defined in claim 1, wherein the step of moving a road-worthy chassis onto said mobile unit includes the step of accurately positioning the chassis longitudinally of said mobile unit.

5. The method as defined in claim 1, including the steps of connecting a plurality of road-worthy chassis in series with one another and moving said road-worthy chassis sequentially into position onto said mobile unit and repeating the steps of raising and lowering the platform and transferring the cargo with each of said road-worthy chassis and the associated platforms.

6. A cargo handling system comprising, in combination:
   a road-worthy chassis including a frame and supporting wheels therefor, and a load-receiving platform on said frame and having opposite side edge portions which project laterally beyond said supporting wheels;
   a mobile unit having a floor receiving and supporting said road-worthy chassis above the ground surface, said mobile unit including wheels movably supporting same, support means located along opposite sides of said floor and clearing said supporting wheels of the road-worthy chassis for engaging beneath said opposite side edge portions of said load-receiving platform to support said platform independently of the support normally provided therefor by said supporting wheels, and lift means for raising and lowering said support means vertically to position at least said load-receiving platform in alignment with the cargo deck of an aircraft while the platform is independently supported as aforesaid.

7. A cargo handling system as defined in claim 6 wherein said mobile unit includes a floor supporting said road-worthy chassis, said load-receiving platform being removably resting on said frame, and said lift means being disposed outboard of the wheels of said road-worthy chassis and having said support means fixed thereto and forming part thereof.

8. A cargo handling system as defined in claim 6 wherein said mobile unit includes a floor and means extending longitudinally thereon for laterally positioning said road-worthy chassis and said load-receiving platform with respect to said support means.

* * * * *